UNITED STATES PATENT OFFICE.

HENRY A. AMELUNG, OF NEW YORK, N. Y.

IMPROVED COMPOSITION FOR COVERING HAMS.

Specification forming part of Letters Patent No. 40,803, dated December 8, 1863.

*To all whom it may concern:*

Be it known that I, H. A. AMELUNG, of the city, county, and State of New York, have invented a new and Improved Composition for Sealing Hams, &c.; and I do hereby declare that the following is a full, clear, and exact description of the same.

The object of this invention is to seal hams and other meats in a simple, cheap, and efficient manner, so that the same are preserved against the influence of the atmosphere, and will not spoil in a long time.

The invention consists in the application to ham or other meats of tissue-paper or cloth soaked in a solution of gum-shellac and alum in alcohol with a slight addition of linseed or olive oil in such a manner that all parts of the ham or other piece of meat are perfectly covered and protected against the injurious and decomposing influence of the atmosphere.

The proportion in which I mix the ingredients of my solution is about as follows: gum-shellac, one part; alcohol, four parts; oil, one-sixteenth part; alum, (pulverized,) one-sixteenth part. The shellac may be replaced by any other gum of a similar nature. The above-named ingredients are placed in a vessel together and well stirred, in order to mix the different materials intimately. A piece of tissue-paper or cloth is then completely saturated or coated on one side by means of a painter's brush, and applied to the surface of the ham or meat, said paper or cloth having first been cut to correspond in size to the surface to be covered. After the surface of the ham or meat has thus been completely covered the outer surface of the paper or cloth is also coated with the same solution by means of a soft brush, which presses the paper into every aperture or cavity of the ham, and causes it while drying to lie perfectly close to the surface of said ham all over. The paper will dry in a few minutes, and if it is desired to render the covering or sealing still more perfect an additional coat of the solution can be applied, or another covering of the paper can be added, or cotton cloth saturated in the above-named solution can be used for the whole covering or for a portion of the same by running a strip of the cloth, when saturated, around the outer end or fatty surface of the ham.

The principal advantages derived from this invention are as follows: The covering costs but one-quarter of the ordinary covering made of canvas or bagging. It prevents evaporation, thereby reducing the loss in weight at least ninety per cent. in the course of the ham season. It is impervious to water and to the atmospheric air and proof against insects, and thus the ham retains its original juice and is perfectly preserved in every respect.

What I claim as new, and desire to secure by Letters Patent, is—

A covering for ham or other meat, consisting of paper or cloth soaked in a solution made of the ingredients herein specified and mixed together in about the proportion and substantially in the manner described.

HENRY A. AMELUNG.

Witnesses:
J. SUMMERFIELD,
WM. M. EVERITT.